United States Patent
Booth et al.

(10) Patent No.: US 7,323,967 B2
(45) Date of Patent: Jan. 29, 2008

(54) ELECTRONICALLY-CONTROLLED LOCKER SYSTEM

(75) Inventors: Kevin E. Booth, Mapleton, UT (US); Harry N. Popolow, Cherry Hill, NJ (US); Richard R. Ford, Asheville, NC (US); Edward E. Johnson, Asheville, NC (US); Jon S. Loftin, Arden, NC (US); Lance C. Osborne, Asheville, NC (US); David W. Johnson, West Valley City, UT (US)

(73) Assignees: Penco Products, Inc., Oaks, PA (US); Digitech International, Inc., Asheville, NC (US)

( * ) Notice: Subject to any disclaimer, the term of this patent is extended or adjusted under 35 U.S.C. 154(b) by 311 days.

(21) Appl. No.: 11/040,338

(22) Filed: Jan. 21, 2005

(65) Prior Publication Data

US 2005/0179349 A1    Aug. 18, 2005

Related U.S. Application Data

(63) Continuation of application No. 10/075,694, filed on Feb. 14, 2002, now Pat. No. 6,879,243.

(51) Int. Cl.
*B60R 25/00* (2006.01)
*G05B 19/00* (2006.01)
*G06F 7/00* (2006.01)
*G08B 29/00* (2006.01)
*H04B 1/00* (2006.01)

(52) U.S. Cl. .................. 340/5.73; 340/5.2; 340/825.29

(58) Field of Classification Search ............... 340/5.73, 340/825.29, 5.2, 5.21–5.27, 5.7, 5.8, 5.81–5.86; 700/241, 242, 17; 235/46, 382

See application file for complete search history.

(56) References Cited

U.S. PATENT DOCUMENTS

| 2,153,088 | A | 4/1939 | Knell |
| 3,785,187 | A | 1/1974 | Wolz |
| 3,831,408 | A | 8/1974 | Featherman |

(Continued)

FOREIGN PATENT DOCUMENTS

DE    100 00 830    7/2001

(Continued)

OTHER PUBLICATIONS

PCT/US2003/03711, International Search Reported dated Feb. 6, 2003.

(Continued)

*Primary Examiner*—Brian Zimmerman
*Assistant Examiner*—Nam Nguyen
(74) *Attorney, Agent, or Firm*—Caesar, Rivise, Bernstein, Cohen & Pokotilow, Ltd.

(57) ABSTRACT

An electronically-controlled locker system that utilizes distributing processing to control access to, and assignment of, a plurality of lockers in a school, workplace, fitness center, etc. The system uses a plurality of locker control units that control access to a corresponding set of lockers based on user inputs and on user/locker authorization data that is provided from a central administrator workstation. This administrator workstation communicates with a system control unit that is in communication with every locker control unit and which allows cross-communication between locker control units.

2 Claims, 16 Drawing Sheets

U.S. PATENT DOCUMENTS

| | | | |
|---|---|---|---|
| 3,984,658 A | 10/1976 | Cannon | |
| 5,219,386 A | 6/1993 | Kletzmainer et al. | |
| 5,231,272 A | 7/1993 | Mardon | |
| 5,345,379 A | 9/1994 | Brous et al. | |
| 5,475,375 A | 12/1995 | Barrett et al. | |
| 5,475,378 A | 12/1995 | Kaarsoo et al. | |
| 5,689,229 A | 11/1997 | Chaco et al. | |
| 5,774,058 A | 6/1998 | Henry et al. | |
| 6,064,316 A | 5/2000 | Glick et al. | |
| 6,185,773 B1 | 2/2001 | Goedde | |
| 6,347,486 B1 | 2/2002 | Badillet | |
| 6,456,900 B1 | 9/2002 | Kakuta | |
| 2001/0017507 A1 | 8/2001 | Hara | |

FOREIGN PATENT DOCUMENTS

| | | |
|---|---|---|
| EP | 1 330 184 | 9/1973 |
| EP | 1 336 807 | 11/1973 |
| EP | 1 373 281 | 11/1974 |
| EP | 1 419 375 | 12/1975 |
| EP | 2 078 845 | 1/1982 |
| EP | 2 159 567 | 4/1985 |
| WO | WO 01/63494 | 8/2001 |

OTHER PUBLICATIONS http://epics.ecn.purdue.edu.slac/locker/locker.html, Automated Locker, 2001.
www.aronson-campbell.com/autmoated.html, Washington, 1999.
www.firstcube.com/ourideas_content.htm, Smart Locker System.
www.wwwga.com/prod01.html, CribMaster, Marietta, Georgia.

— 129A

— 129B

— 129C

ELECTRONICALLY-CONTROLLED LOCKER SYSTEM

CROSS-REFERENCE TO RELATED APPLICATIONS

This continuation application claims the benefit under 35 U.S.C. §120 of application Ser. No. 10/075,694 filed on Feb. 14, 2002 now U.S. Pat. No. 6,879,243 entitled ELECTRONICALLY-CONTROLLED LOCKER SYSTEM and whose entire disclosure is incorporated by reference herein.

FIELD OF THE INVENTION

The invention generally relates to electronically-controlled lockers, and more particularly, to a system for remotely-controlling access to a plurality of lockers such as those found in schools, fitness clubs, employee lockers, airports, resorts, shopping malls, and law enforcement.

BACKGROUND OF INVENTION

There are now increased security needs in schools and commercial buildings. There is also a high degree of computer literacy among educators, and property managers. Furthermore, there is increasing use of ID cards, coded with intelligence for recording of activities and the trend now is towards large school construction budgets with more funds being allocated to security issues. It is now common place for new construction to include extensive pre-wiring for data transmission systems. As a result, there remains a need for an electronically controlled locker system for use, especially in schools. For example, school administrators can spend up to 240 man hours setting up lockers and locks for the new school year, which does not even include the time and effort involved in handing out and returning of padlocks, combination locker assignments and accompanying paperwork.

The following patents and patent applications relate to electronic lockers: U.S. Pat. No. 2,153,088 (J. Knell); U.S. Pat. No. 3,831,408 (Featherman); U.S. Pat. No. 5,219,386 (Kletzmaier et al.); U.S. Pat. No. 5,774,058 (Henry et al.); U.S. Pat. No. 6,061,316 (Glick, et al.); U.S. Patent Application No. US 2001/0017507(Hara); and British Patent Application GB 2078845 (Kindborg).

However, in view of the above, there still remains a need for an electronically-controlled locker system that provides system administrators, especially school administrators, with locker management capabilities that are not possible with conventional locker systems that enhance security and reduce operating costs.

SUMMARY OF THE INVENTION

An electronically-controlled locker system for use by a plurality of authorized users (e.g., school students, employees at a workplace, patrons at a fitness center, airport, etc.,) and managed by an administrator. The system comprises: a first plurality of lockers wherein each locker comprises a respective electronically-activated lock; at least one input device (e.g., a card reader, keypad, proximity reader, biometric, display and/or touch screen, etc.) for allowing the plurality of authorized users to communicate with the system; at least one locker control unit, in communication with each electronically-activated lock and with the at least one input device wherein the at least one locker control unit controls the activation of the electronically-activated locks; a computer, controlled by the administrator, for maintaining a database of authorized user and locker information; a system control unit, in communication with the at least one locker control unit and with the computer, wherein the system control unit provides the at least one locker control unit with the authorized user and locker information; and wherein the at least one locker control unit uses data from the at least one input device and the authorized user and locker information to provide access to corresponding lockers for the plurality of authorized users.

A method for controlling access to a plurality of lockers for a plurality of authorized users (e.g., school students, employees at a workplace, patrons at a fitness center, airport, etc.,) by an administrator. The method comprises the steps of: storing and maintaining information about the plurality of authorized users and the plurality of lockers, referred to as predetermined data, at a first location; providing an electronic lock at each one of the plurality of lockers; assigning a respective locker control unit to a respective subset of the plurality of lockers, wherein each of the locker control units communicates with every electronic lock in the subset and each of the locker control units is located in the vicinity of a respective subset; coupling at least one input device to each of the locker control units for permitting the authorized users in that subset to request access to their respective lockers; loading each of the locker control units with the predetermined data from the first location; controlling access to each of the lockers in a subset by a respective locker control unit based on the predetermined data and the access request by the authorized users.

An electronically-controlled locker system for use by a plurality of authorized users (e.g., school students, employees at a workplace, patrons at a fitness center, airport, etc.,) and managed by an administrator. The system comprises: a first plurality of lockers wherein each locker comprises a respective electronically-activated lock; at least one input device (e.g., a card reader, keypad, proximity reader, biometric, display and/or touch screen, etc.) for allowing the plurality of authorized users to communicate with the system; at least one locker control unit, in communication with each electronically-activated lock and with the at least one input device, and wherein the at least one locker control unit controls the activation of the electronically-activated locks; a computer, controlled by the administrator, for managing at least one database of authorized user and locker information, and wherein the computer is in communication with the at least one locker control unit for providing the at least one locker control unit with the authorized user and locker information; and wherein the at least one locker control unit uses data from the at least one input device and the authorized user and locker information to provide access to corresponding lockers for the plurality of authorized users.

DETAILED DESCRIPTION OF THE PREFERRED EMBODIMENTS

Figure 1:
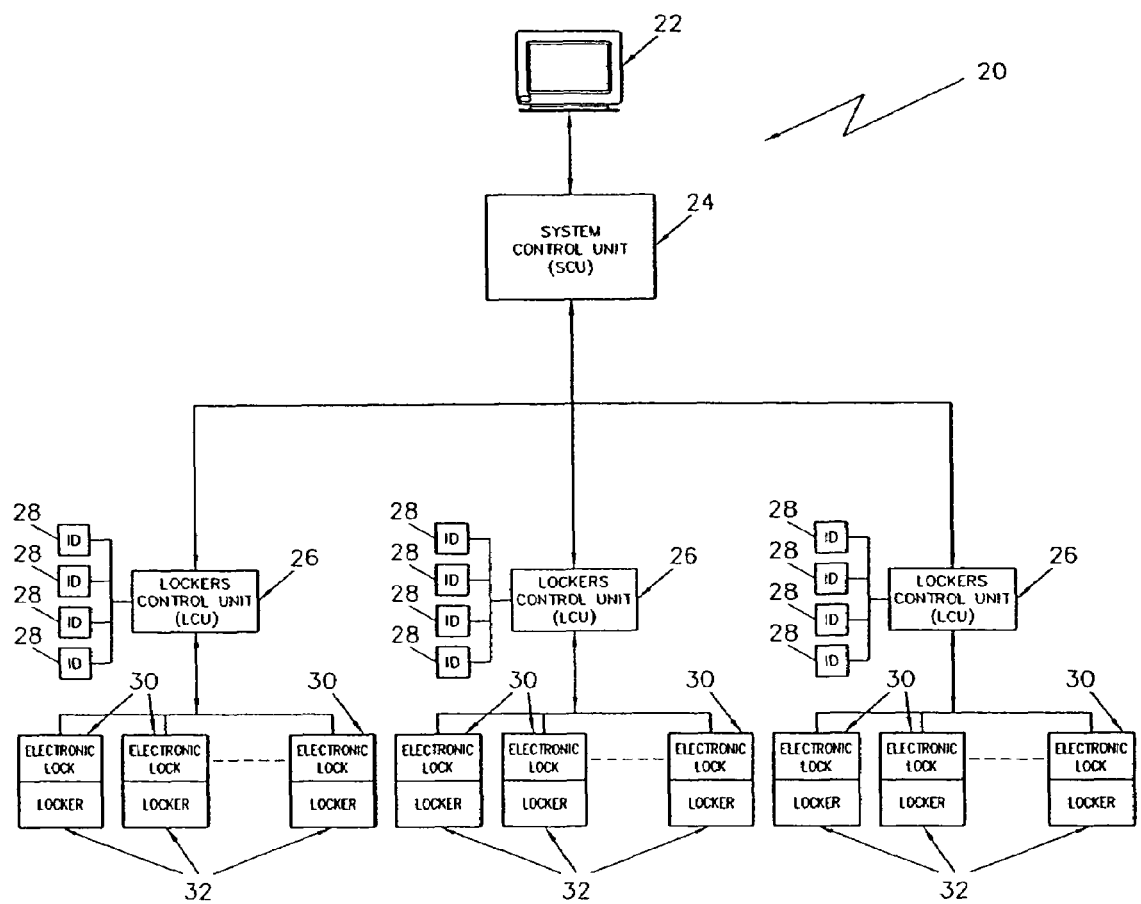
FIG. 1 is block diagram of the electronically-controlled locker system (ECLS) of the present invention.
Figure 2:
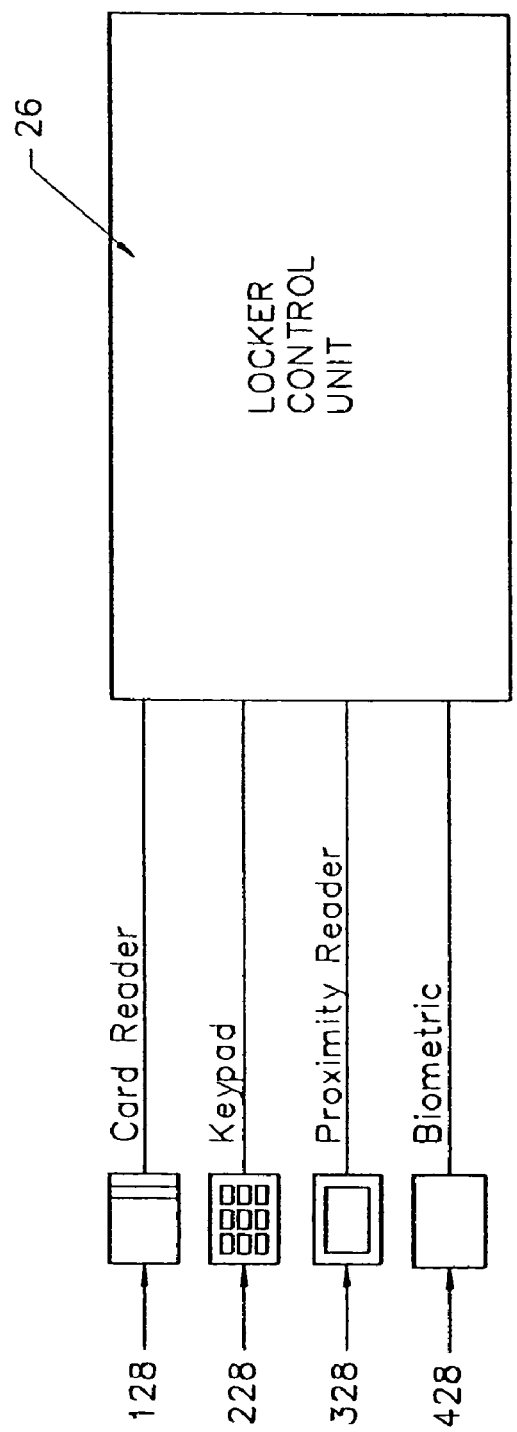
FIG. 2 is a block diagram of exemplary types of input devices that may be coupled to each locker control unit (LCU)

Referring now in detail to the various figures of the drawing wherein like reference characters refer to like parts, there is shown at 20 in FIG. 1 an electronically-controlled locker system (hereinafter the "ECLS") of the present invention. The ECLS 20 basically comprises a system administrator computer 22 (SAC, e.g., a personal computer having Windows-95 capability, Apple Macintosh capability, etc.), a system control unit (SCU) 24, a plurality of locker control units (LCUs) 26, a plurality of input devices (IDs) 28 that control access to another plurality of electronic locks 30 for respective lockers 32. Although the ECLS 20 is primarily designed for use in schools, the ECLS 20 can be easily adapted for use in other environments such as fitness clubs, employee lockers, workplaces, airports, resorts, shopping malls, law enforcement, etc., or any environment where it is desirable to control access to banks of lockers from a remote location. The ECLS 20 provides the ability to search locker availability and to dynamically assign (see FIG. 8) lockers, e.g., in gymnasium and health club settings.

Figure 3:
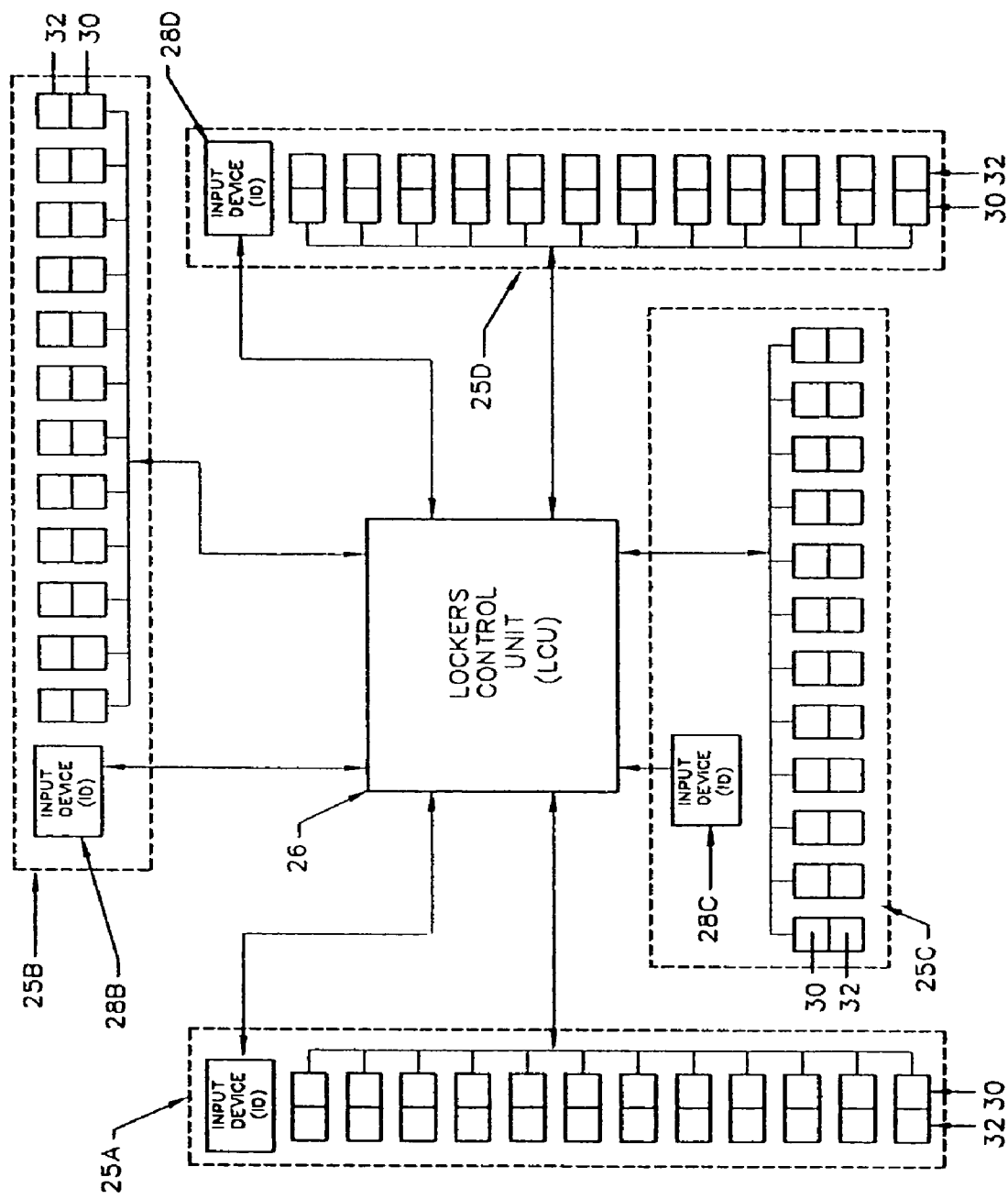
FIG. 3 is a block diagram of the interface of a single LCU and depicting locker access stations (LASs)
Figure 4:
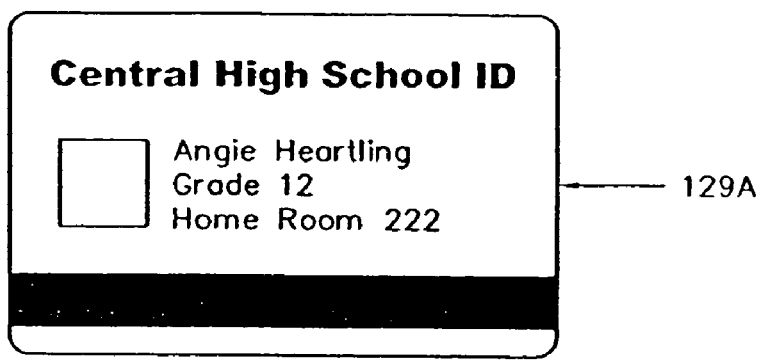
FIG. 4 depicts three exemplary electronic access key cards for use in a school ECLS, a fitness center ECLS and a workplace ECLS.
Figure 4:
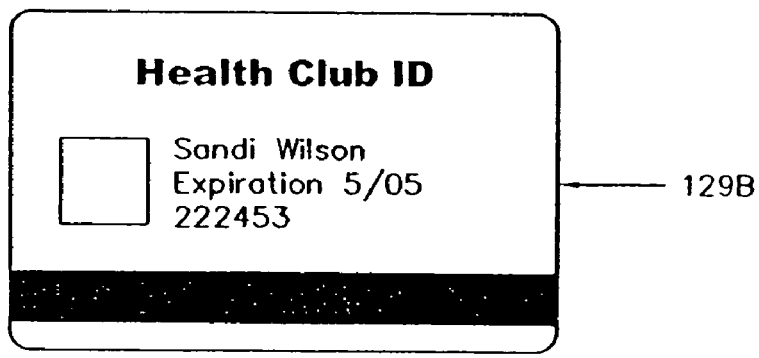
Figure 4:
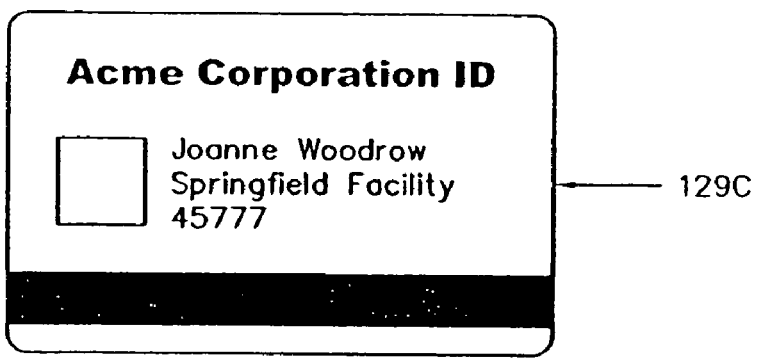

It should be understood that the ECLS 20 allows for the use of various types of IDs 28 such as card readers 128, keypads 228, proximity readers 328, biometrics 428, display screens 60 (including touch screen, not shown) or any other type of individual input/output device that permits the individual to provide an input into, and obtain output from, the ELCS 20 at the locker level and obtain access, if proper, to his/her corresponding locker 32. Thus, as used throughout this Specification, the terminology "ID 28, ID 28A, ID 28B, ID 28C, and ID28D (see FIG. 3)" includes all of these various input/output means and is not limited to any particular one of them. Where card readers 128 are used, and depending on the environment, FIG. 4 depicts exemplary electronic access key cards 129A (for use in a school ECLS 20), 129B (for use in a fitness center ECLS 20) and 129C (for use in a workplace ECLS 20). Furthermore, as used throughout this Specification, the term "biometric" includes any technology that identifies or verifies individuals based upon an individual's unique physical or behavioral characteristics. Devices employing these technologies match patterns of live individuals in real time against pre-stored records. Examples of biometric technologies are, but are not limited to, those that recognize and authenticate faces, hands, fingers, signatures, irises, voices, fingerprints, etc. The use of RS-485 ports in the LCUs 26 support the interface of "smart" input devices and allow for virtually any type of input device to the LCUs 26.

Figure 13A:
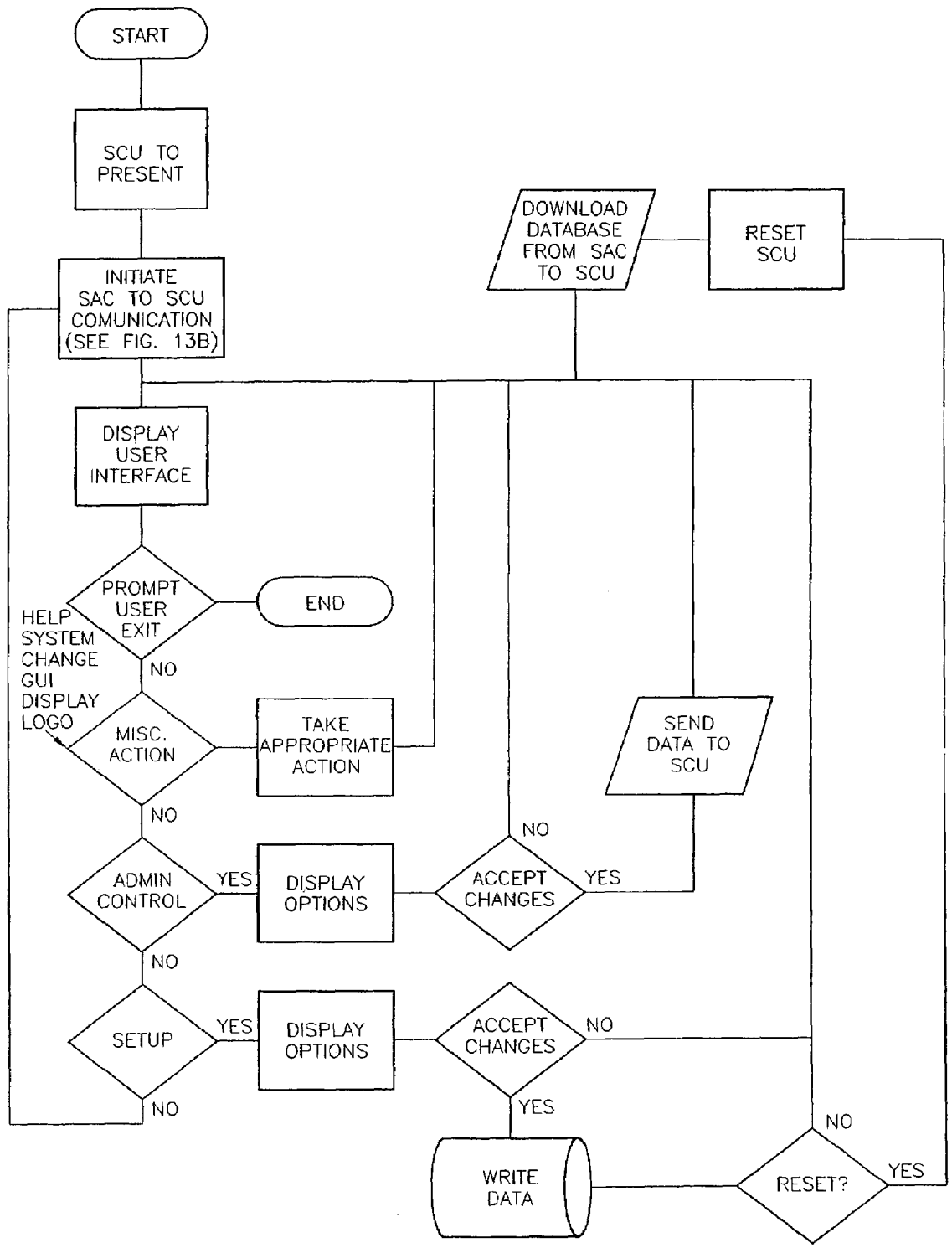
FIGS. 13A-13B form a flowchart of system administrator computer (SAC) operation.
Figure 13B:
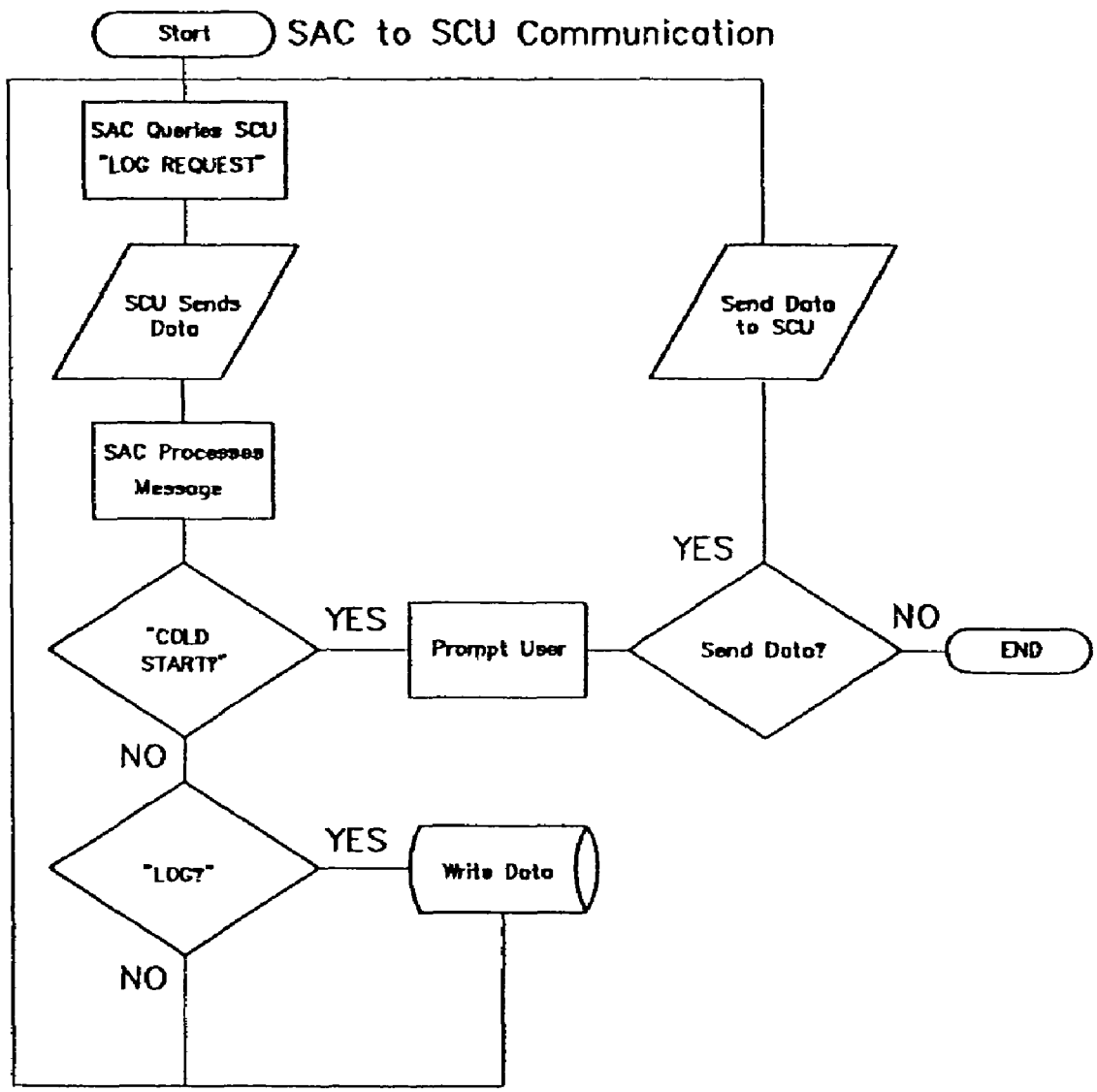

In particular, the SAC 22 provides the system administrator with a non-dedicated, user interface to the ECLS 20 and maintains a database of ECLS 20 information. The SAC 22 is typically provided by the customer. The SAC 22 utilizes administrative/electronic locker software that runs on the personal computer. The software running on the personal computer manages information about the lockers 32, the electronic hardware (e.g., the SCU 24, LCUs 26), the users, passwords, locker assignments, etc., and stores this in a database. The software that runs on the SAC 22 may be coded using the JAVA programming language, or other programming languages, to provide portability to Windows, Macintosh, and Linux operating systems. FIGS. 13A-13B provide a flowchart of SAC 22 operation. The SAC 22 communicates with the SCU 24 via a communications medium, e.g., standard RS-232C serial interface. The SCU 24 is a custom-made electronic with microprocessors or micro-controllers and communication interfaces, e.g., RS-232 and/or RS-485 interfaces. The SCU 24 device comprises firmware, specific to the operation of the ECLS 20, encoded onto chips on internal hardware boards.

The SCU 24 sends data and control information to each LCU 26. The SCU 24 acts like a "master control" for the ECLS 20 and facilitates communication between LCUs 26 and uploads activity logs from each LCU 26. In particular, the SCU 24 downloads user information to each LCU 26, provides a communication link from any ID 28 to any LCU 26 in the ECLS 20, executes administrative commands throughout the ECLS 20, performs diagnostic checks on each LCU 26 and provides system alarm monitoring capability. Both the SCU 24 and the LCUs 26 may include respective battery back-up provisions (see FIGS. 9 and 11, respectively) to ensure reliable access for users even in the event of power failure. The battery back-up for these devices provides operation for a predetermined period of time (e.g., up to four hours) with no external power. The SCU 24 has small onboard batteries (e.g., battery S46; see FIG. 9) to provide back-up of user information but does not have full functionality without battery back-up.

Figure 9:
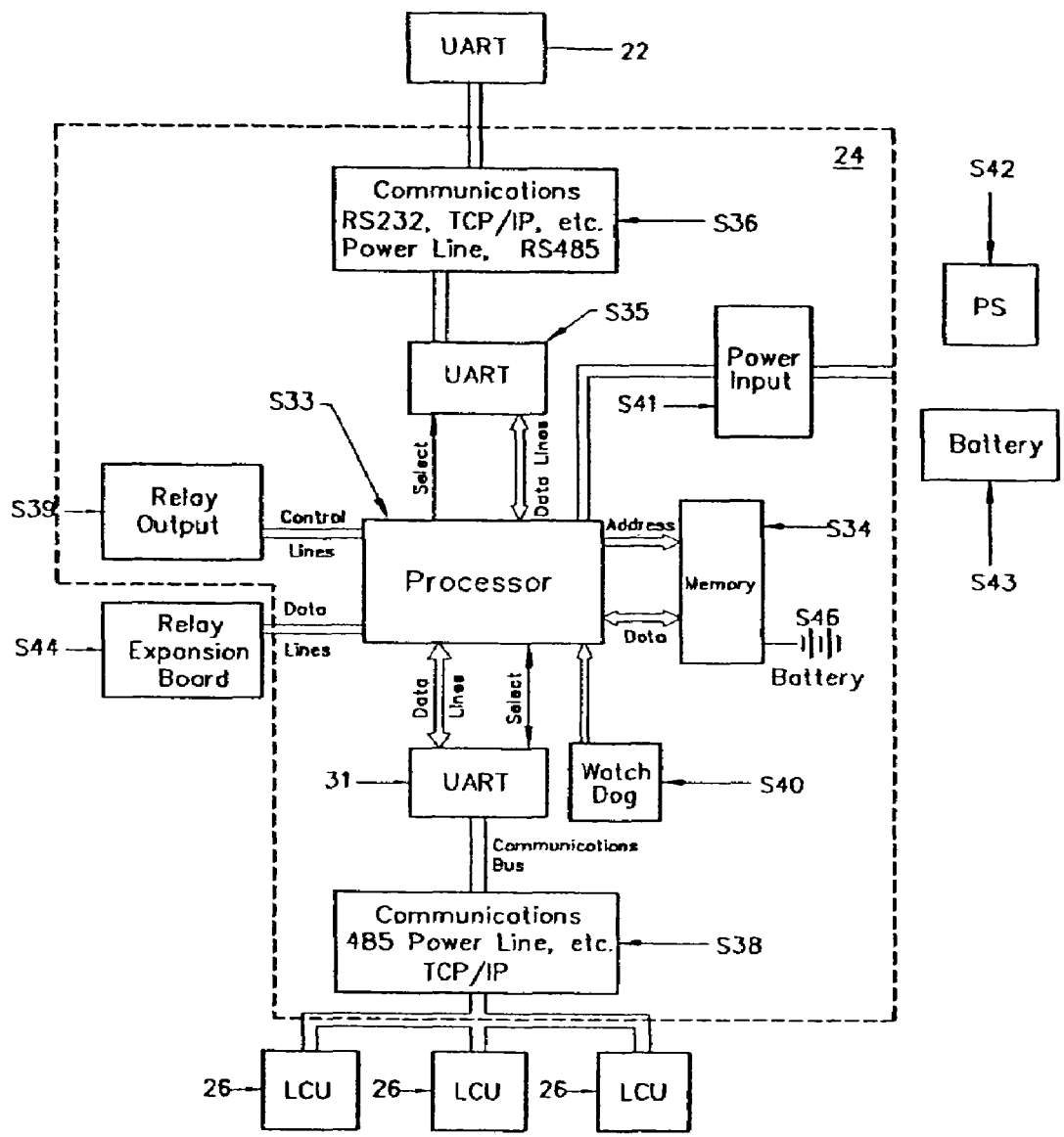
FIG. 9 is a hardware diagram of the system control unit (SCU)

In particular, as shown most clearly in FIG. 9, the SCU 24 accepts input from the SAC 22 and distributes the information to the LCUs 26 and other devices. The SCU 24 comprises UART (Universal Asynchronous Receiver Transmitter) S31 which allows an internal processor S33 input data for transmission on different media. UART S31 is used for communications to the LCUs 26. The processor S33 is the main component of the SCU 24. Through embedded firmware, the processor S33 handles all communications between the SAC 22 and the LCUs 26, memory access. The processor S33 handles all communications between the SAC 22 and the SCU 24. The information/data is then stored in memory at the SCU 24 and is sent to the appropriate LCU 26. The processor S33 also handles the communication between the SCU 24 and LCU 26. The processor in the LCU 26 then takes the data that was sent by the SCU 24 and stores it in the LCU's 26 own memory. An exemplary processor is a Motorola 6809 but other processors could be used. The SCU controller board includes a High Speed 128K CMOS RAM chip S34. This chip S34 is used for storing tenant access codes, configuration setups and other information.

Figure 10:
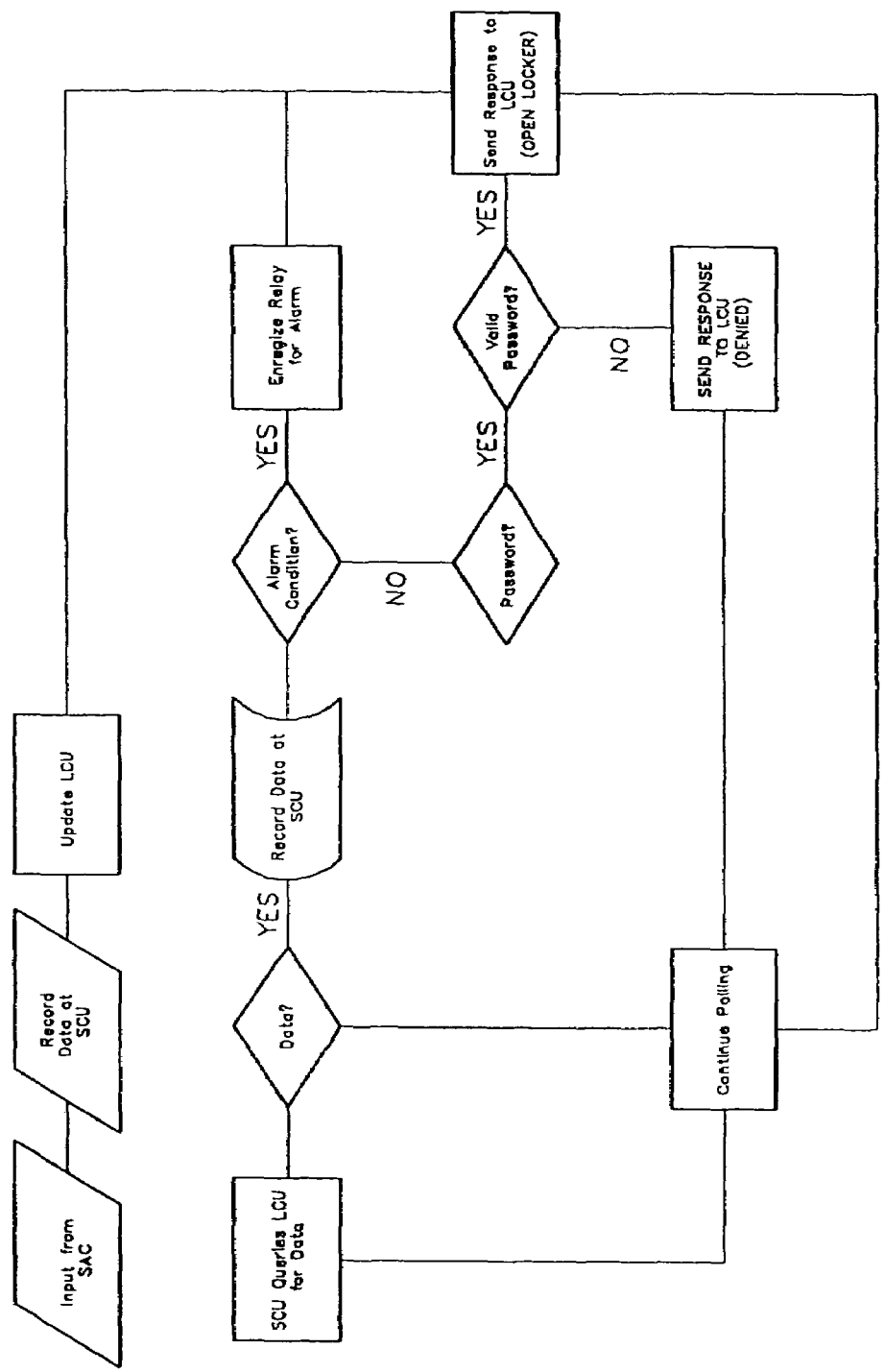
FIG. 10 is a flowchart of the system control unit (SCU) operation.

UART S35 allows the processor S33 to output data for transmission on different media and is used for communications to the SAC 22. Communications circuitry S36 allows for communications on different types of media (Power Line, RS-485, Network, etc.,). This circuitry S36 interfaces between UART S35 and the appropriate communications media. Communications circuitry S36 is used for communications to the SAC 22. Communications circuitry S38 allows for communications also on different types of media (e.g., Power Line, RS-485, Network, etc.,). Communications circuitry S38 interfaces between UART S31 and the appropriate communications media and is used for communications to the LCUs 26. The SCU 24 controller board has a normally-opened or normally-closed relay output S39. The relay S39 is rated at 10A/28VDC or 10A/20VAC. This relay S39 can be configured to interface with a siren or alarm panel. In normal situations, the relay S39 is configured to energize for a specified period of time after an alarm condition occurs. The SCU 24 includes supervisory hardware S40 to automatically restart the microprocessor S33 should it encounter power fluctuations sufficient to cause erratic operation or lock the processor S33 up but insufficient to trigger a power-on restart. The SCU 24 requires a power supply connected to the ECLS 20. The power is then distributed to appropriate places on the SCU 24 circuit board through a power input/bus. S41. In addition, the SCU 24 can have an optional battery backup device S43 which allows for the SCU 24 to operate in the event of a power failure and also operates through the power input/bus S41 which routes the power from the battery S43 to the appropriate places on the circuit board. The system controller includes a system bus port, also referred to as relay expansion board S44, which allows for expansion to other relay boards and other devices to be connected directly to the SCU 24. All ECLS 20 data is stored in nonvolatile memory powered by a lithium battery S46. In addition, the battery S46 provides power for the real time clock circuit. The SCU 24 circuit board retains all configurations and access codes as well as keeps the ECLS 20 time current for approximately thirty days. This allows the ECLS 20 to resume operation after an extended power outage. Although not shown, the SCU 24 controller board has an onboard parallel printer output which allows for a PC-compatible printer to be connected directly to the ECLS 20; the printer allows for the user to have a real time, hard copy record of site activity. FIG. 10 provides a flowchart of SCU 24 operation.

The LCUs 26 are also custom-made electronics with microprocessors or micro-controllers and communication interfaces, e.g., RS-232 and/or RS-485 interfaces. The LCU 26 devices also comprise firmware, specific to the operation of the ECLS 20, encoded onto chips on internal hardware boards and includes flash memory to provide back-up of user information. Each LCU 26 is hardwired to the electronic lock mechanism 30 in each locker 32 and consequently includes the necessary electronics to supply power to the locks 30. The LCUs 26 also contain circuitry to determine if a locker door is open or closed and also includes means to detect an unauthorized entry condition and to set an alarm accordingly. Thus, the ECLS 20 is a distributed processing system since each LCU 26 has onboard processing and stores essential locker control data while logging locker activity.

Figure 11:
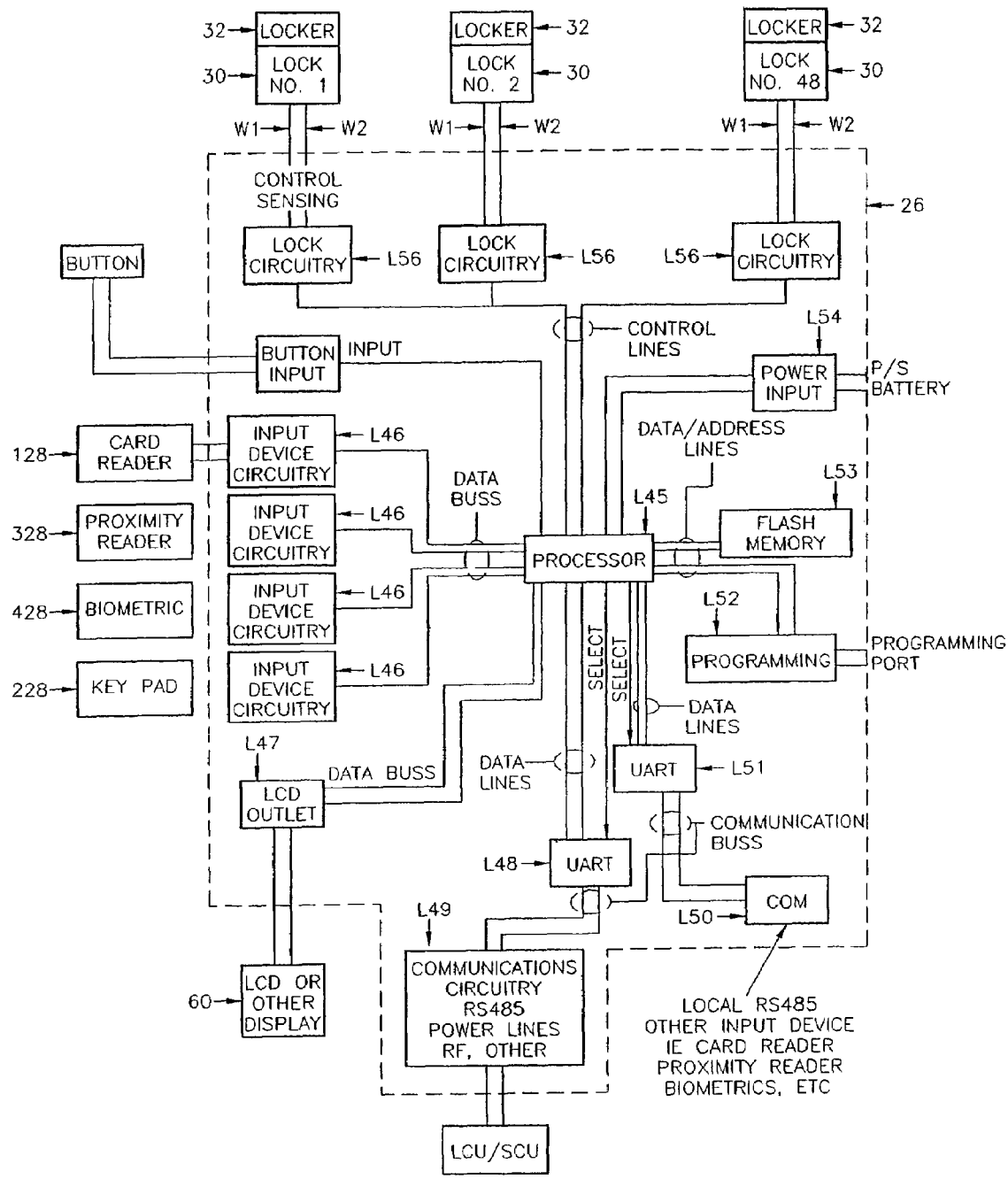
FIG. 11 is a hardware diagram of a locker control unit (LCU)
Figure 12:
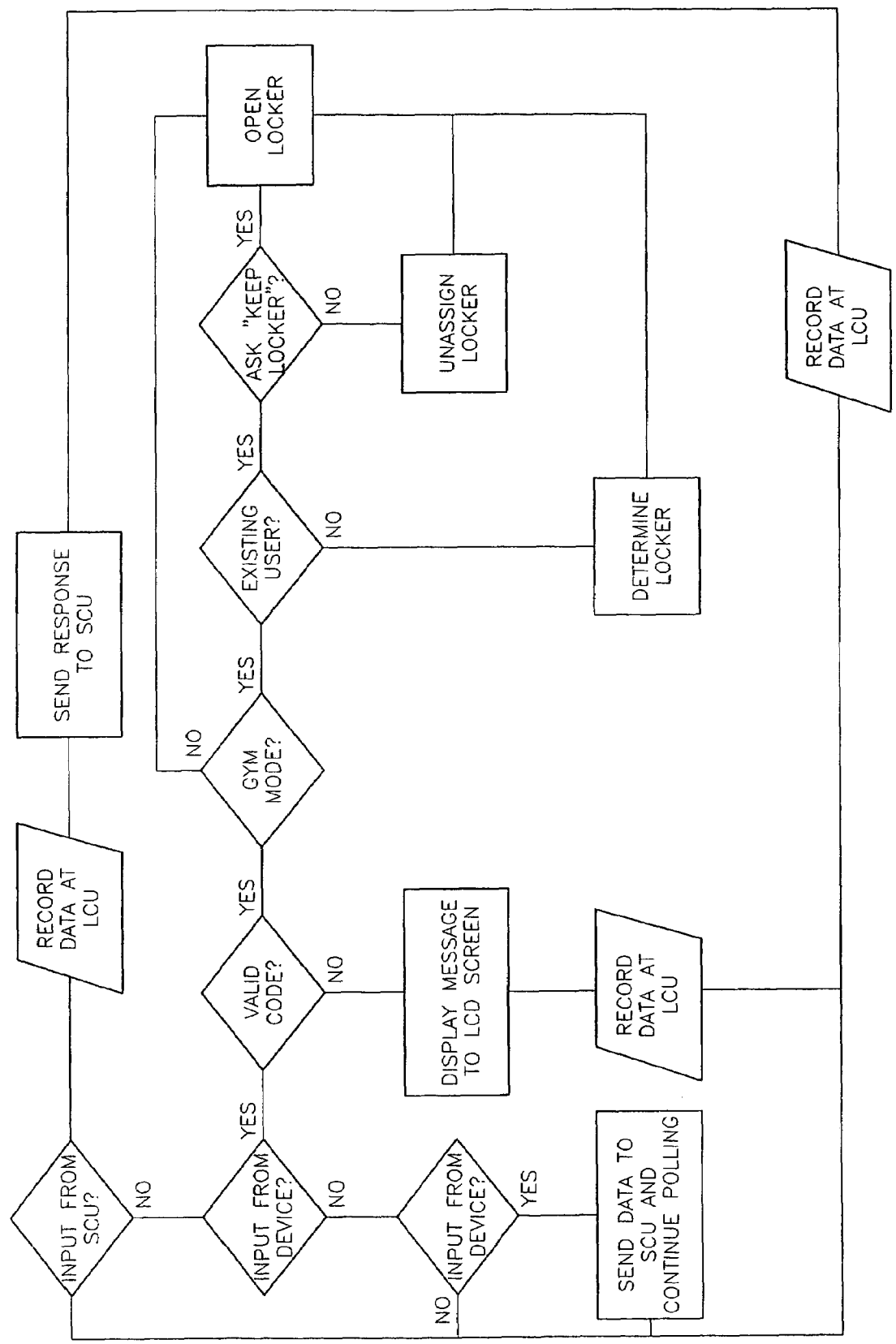
FIG. 12 is a flowchart of a locker control unit (LCU) operation.

In particular, as shown most clearly in FIG. 11, each LCU 26 comprises a processor L45 for handling communications between the LCU 26 and the SCU 24 and for performing locker 32 opening and locker sensing (e.g., door open/closed), as will be discussed in detail later. An exemplary processor Motorola MC68HC908GP32. The LCU 26 board contains circuitry L46 that allows the ECLS 20 to interface with the IDs 28. The LCU contains input device circuitry L46 and firmware to control four IDs 28 (as will be discussed in detail later) to be connected directly to LCU 26 circuit board. Each LCU 26 also includes a LCD (liquid crystal display) port L47 capable of interfacing with LCD displays 60 up to eighty characters from several different manufacturers. The LCD port L47 provides required power, data and contrast control. Each LCU 26 comprises a UART L48 that allows the processor L45 to output data for transmission on different media. UART L48 is used for communications to the LCU 26. Communication circuitry L49 allows for communications on different types of media (e.g., Power Line, RS-485, Network, etc.) interfaces between UART L48 and the appropriate communications media. Circuitry L49 is used for communications to the SCU 24. Communication circuitry L50 allows for communications on different types of media (e.g., Power Line, RS-485, Network, etc.,) and interfaces between UART L51 and the appropriate communications media. Communications circuitry L50 is used for communications to other devices that are connected directly the LCU 26 board. UART L51 allows the processor L45 to output data for transmission on different media and is used for communications to other devices that are connected directly to the LCU 26 board. UART L51 allows for communication to other remotely located devices. Each LCU 26 also contains an RS232 port L52 that allows for field programming of the LCU 26 firmware. Each LCU 26 board includes a flash chip L53 which is used for storing tenant access codes, configuration setups and other information. A power input L54 routes the power from a power supply and/or a battery to the appropriate places on the LCU 26 circuit board. The LCU 26 board also contains an input point L55 that allows the ECLS 20 to be connected to a button B. The button B (adjacent the LCD display 60) can be used for user input (e.g., reserving a locker). As will be discussed next, each LCU 26 has the ability to control a predetermined number (e.g., 48) of lockers 32. The LCU 26 control circuitry L56 handles the energizing of the actuator 61 (e.g., solenoid, motor, etc.,) in each locking mechanism 30. The LCU 26 control circuitry also handles the sensing of the current status of the locker 32 door (e.g., whether the door is open or closed). Locker control circuitry L56 in each LCU 26 connects to each locking mechanism 30 with two wires W1 and W2. The two wires W1/W2 allow for control of the locking mechanism 30 (e.g., open the lock 30) and also allows for sensing of the current status of the door (e.g., is the locker 32 door opened or closed). FIG. 12 provides a flowchart of LCU operation.

As mentioned previously, each LCU 26 controls access to a predetermined number of lockers 32 (e.g., forty-eight lockers) based on user input from a corresponding input device ID 28. These lockers 32/input devices 28 can be distributed over different areas of the school, fitness center, etc., as desired by the customer into locations known as locker access stations (LASs). As shown most clearly in FIG. 3, four LASs 25A-25D are shown under the control of one LCU 26. For example, users having lockers at LAS 25A would communicate with the corresponding input device 28A and, if access is granted, the user would be able to go to his/her corresponding locker 32 at LAS 25A and insert or remove contents from the locker 32. The particular input device ID 28 for a LAS is located in the vicinity of the lockers 32 (e.g., in the middle of, or at the end of, the bank of lockers 32 at the LAS; these lockers 32 having the ID 28 are also known as a "cluster") to permit users to communicate with the ECLS 20 and then to proceed to the particular locker 32 in that LAS; the LCU 26 itself can be located within one of the four LASs 25A-25D. Therefore, in its broadest sense, an LAS may not even comprise the LCU 26. As a result, in its broadest sense, an LAS defines the location where a user provides input to the ECLS 20 in order to gain access to a particular locker 32.

Figure 8:
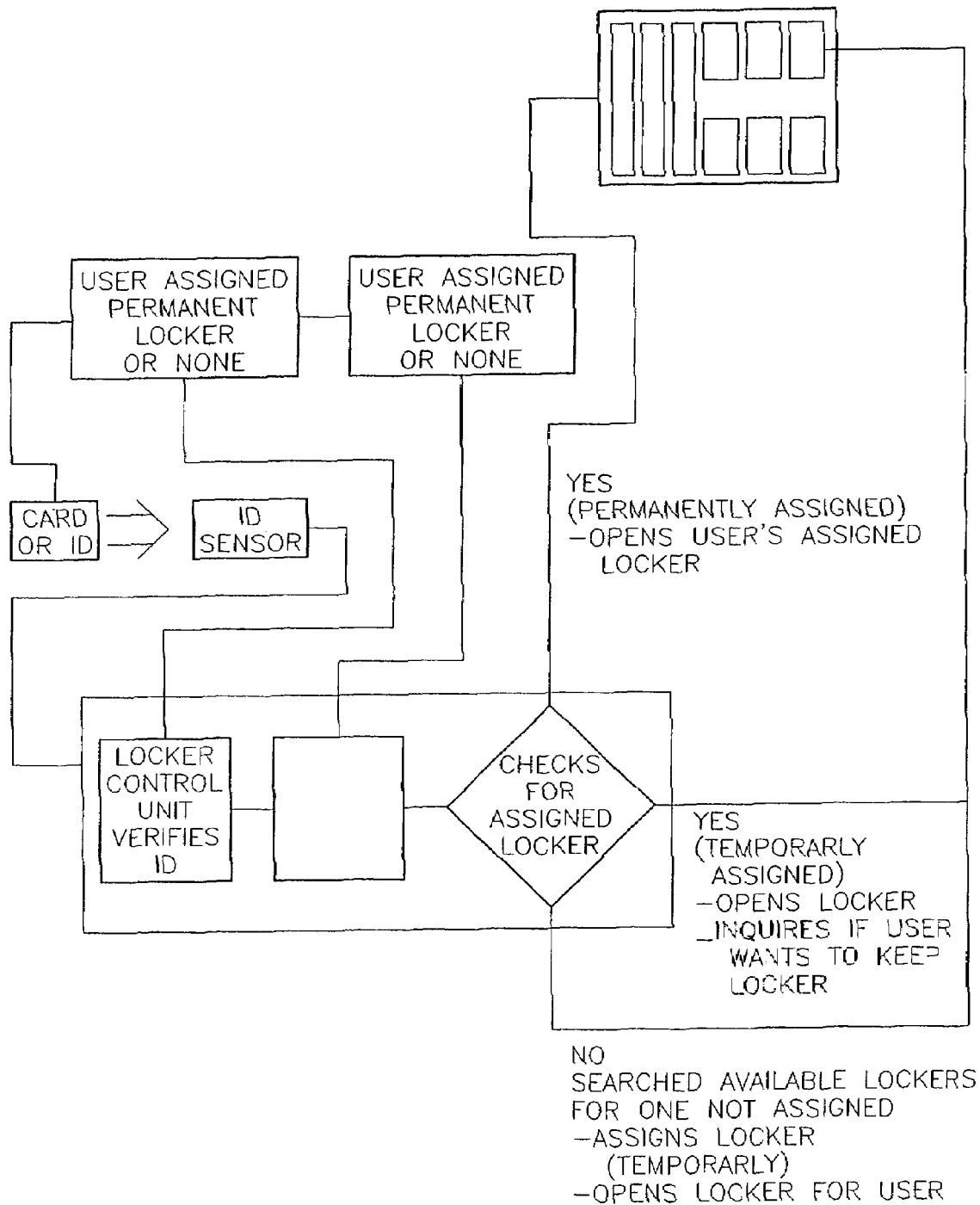
FIG. 8 is a flowchart of the process for dynamically assigning lockers in an ECLS used, for example, in a fitness center.

If the lockers 30 are operating in an "assign-on-demand" mode (e.g., in a locker room or health club) as opposed to the mode where each user has a pre-assigned "permanently" assigned locker (e.g., as in a school corridor), then the LAS contains the input device 28 (e.g., the card reader 128 which includes an LCD display, not shown). When the user activates the card reader 128 (e.g., a magnetic card reader that meets the ISO Specification 7810ID-1,7811/2) by swiping his/her card (e.g., see FIG. 4, card 129B), the ECLS 20 verifies that the card is valid, searches for an available locker, and then opens the electronic lock 30 corresponding to that locker 32. On subsequent swipes of the card 129B (e.g., 30-mil PVC laminated card, in accordance with the ISO specification, and wherein each card comes encoded with a respective user ID), the LCD display 60 provides a message asking if the user wants to keep the locker 32. The user then pushes the button B to indicate that the locker 32 is to be kept; or, in the alternative, the user takes no action at all. This cycle is repeated until the user takes no action at which point the locker 32 then becomes available after a time-out period. FIG. 8 provides a flowchart of this locker assignment process in more detail.

Figure 5A:
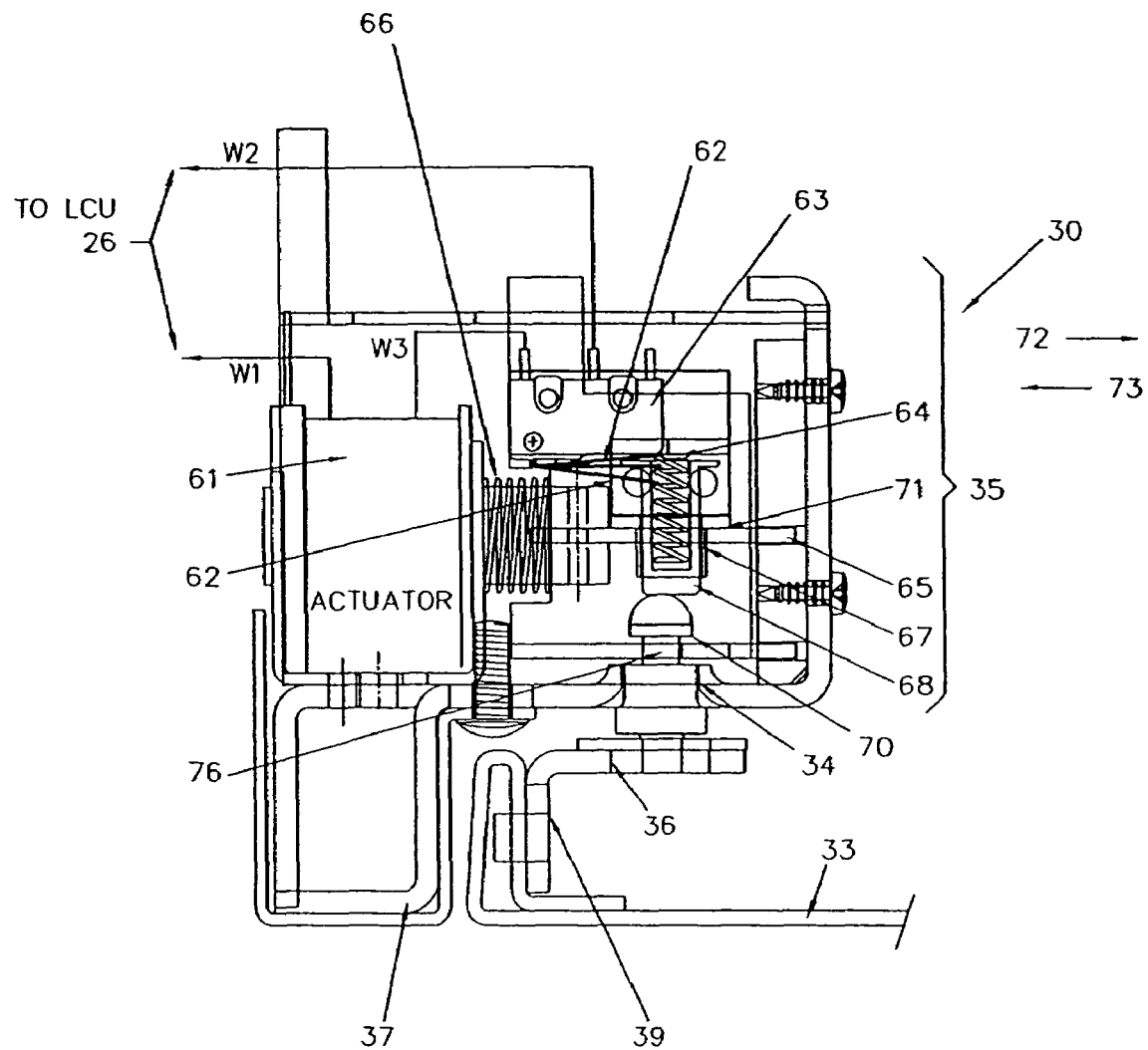
FIG. 5A is a cross-sectional top view of an exemplary electronic lock mechanism that may be used for each locker in the ECLS.
Figure 6A:
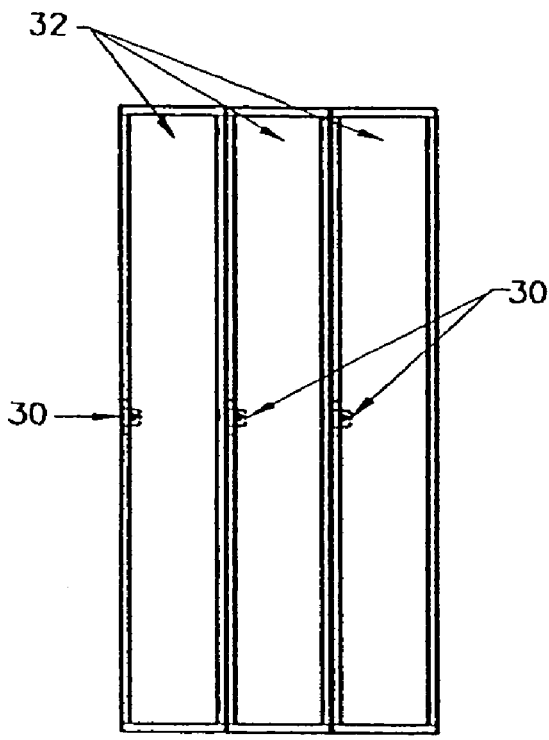
FIGS. 6A-6C depict exemplary single-tier, two-tier and three-tier locker frame configurations, respectively.
Figure 6B:
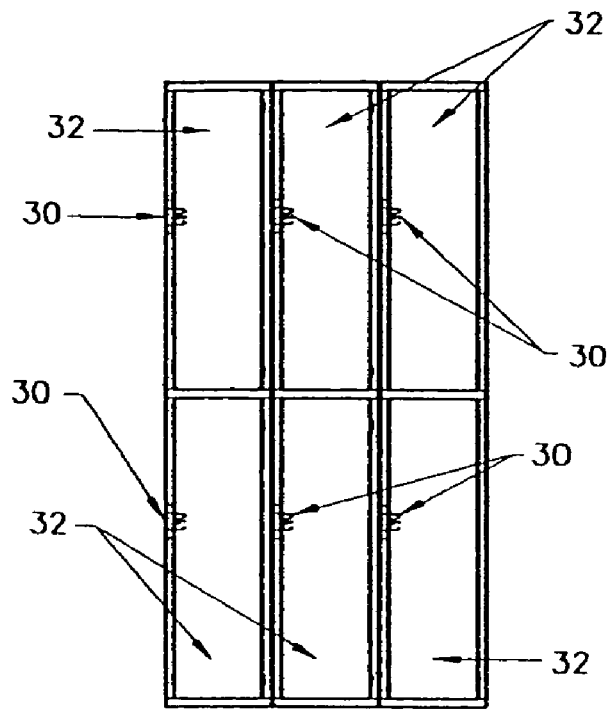
Figure 6C:
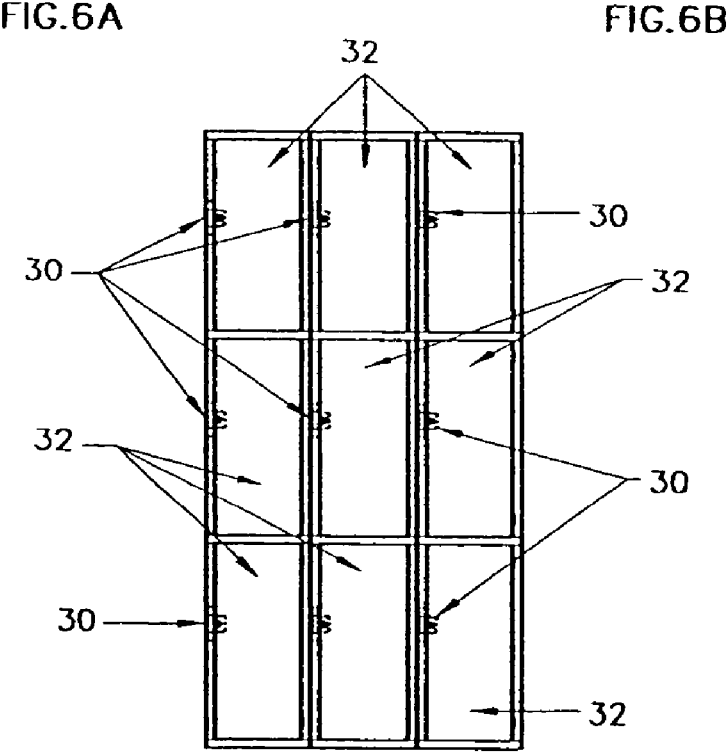

As mentioned earlier, each lock 30 is an electronic lock mechanism and it should be understood that the ECLS 20 may use any locking mechanism that can be activated electrically (see FIG. 5A, e.g., solenoid-operated; a motor-operated mechanism may be used as an alternative, etc.,); thus, each locker 32 is devoid of handles, knobs or other hardware devices; see FIGS. 6A-6C which depict exemplary lockers configurations where FIG. 6A depicts a single tier locker configuration, FIG. 6B depicts a two-tier locker configuration and FIG. 6C depicts a three-tier locker configuration, all by way of example only.

Figure 5B:
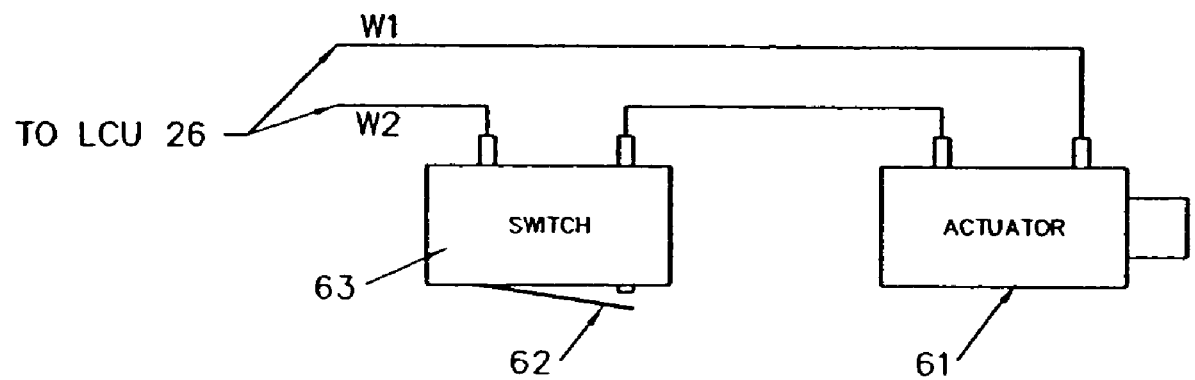
FIG. 5B is a functional diagram of the single circuit used to control each electronic lock mechanism and to detect the open/closed state of each locker door in the ECLS.

Also, by way of example only, the ECLS 20 incorporates a lock design that comprises a pin 34 that is float-mounted to the locker door 33 (FIG. 5A) and a lock portion 35 (FIG. 5A) that is mounted to the locker body 37 and whereby the lock portion 35 captures and releases the pin 34. This arrangement provides for easy concealment of wiring used to connect the locking device 30 to the LCU 26. The locking mechanism 30 allows the locker door 33 to latch automatically when the locker door 33 is closed. Once activated, the lock mechanism 30 releases and the locker door 33 pops open. The locking mechanism 30 is a multi-function device. When the user pushes the locker door 33 closed, it automatically latches. No signal from the LCU 26 is required to accomplish this action. As shown in FIGS. 5A-5B, the lock mechanism 30 incorporates an actuator 61 (e.g., a solenoid, a motor, etc.,) that latches upon command from the LCU 26. The automatic latch mode of operation supports environments where the locker 32 is normally closed. The latch on command mode of operation supports environments where the locker 32 is in a normally open condition (e.g., a gymnasium or health club locker room where lockers are not permanently assigned).

In particular, the pin 34 is float-mounted in a receiver portion 36 that is mounted on a bracket 39 to the locker door 33. The pin 34 comprises a head 68 that gets trapped against a latching plate 65 whose movement is controlled by the actuator 61 and a spring 66. When the locker door 33 is closed, the underside 70 of the head 68 is trapped against surface 71 of the latching plate 65; the latching plate 65 can move in the direction of the arrow 72 (right) or in the direction of the arrow 73 (left). With the door 33 closed, the head 68 compresses a driver member 69 against the action of a coaxial spring 64. Additionally, in this position, the head 68 also closes a contact 62 of a switch 63. As can be seen most clearly in FIG. 5B, closure of the contact 62/switch 63 completes a circuit 74 comprising electrical conductors W1, W2 and W3.

When the LCU 26 commands a locker door 33 opening using a current pulse (e.g., 7 amps @ 0.25 seconds) into the circuit 74, the actuator 61 momentarily moves the latching plate 65 in the direction of the arrow 73, thereby permitting the driver member 69 (under the action of the coaxial spring 64) to forcefully drive the head 68 through a hole 67 in the latching plate 65 and "pop" the locker door 33 open; this action also "opens" the switch 63 since the contact 62 is no longer closed and therefore "opens" circuit 74. This movement of the latching plate 65 in the direction of the arrow 73 causes another spring 66 to compress. Following the LCU command pulse duration, the actuator 61 is de-activated and the spring 66 is free to drive the latching plate 65 in the direction of the arrow 72 which moves the hole 67 slightly out of alignment of the head 68 movement. Conversely, when the user closes the door 33, the head 68 "finds" a portion of the slightly mis-aligned hole 67 and pushes the latching plate 65 in the direction of the arrow 73, against the action of the spring 66. Once the head 68 passes through the hole 67, the spring 66 is free to move the latching plate 65 in the direction of the arrow 72 until one is side of the hole 67 contacts the shank 76 of the pin 34; this action traps the underside 70 of the head 68 against the surface 71 of the latching plate 65, while simultaneously closing the contact 63 of the switch 62.

The circuit 74 also provides the LCU 26 with the means for detecting the open or closed condition of the locker door 33. The LCU 26 polls all of the locker doors 33 using another current pulse (e.g., 36 mA @ 1 ms) and can determine if the circuit 74 is open or closed. An "open" circuit (e.g., no return pulse to the LCU 26) indicates that the locker door 33 is open since the contact 62/switch 63 is not closed; a "closed" circuit (e.g., return pulse detected by the LCU 26) indicates that the locker door 33 is closed since the contact 62/switch 63 is closed. It should be noted that the LCU 26 can poll all of the locker doors 33 in less than a second. As a result, the function of detecting locker door 33 condition (open/closed) and supplying power to the actuator 61 are both accomplished using the circuit 74. This is in contrast to the common approach or running two wires to a locker door sensing device and another two wires to a lock actuator. Thus, this electronic configuration between the LCUs 26 and lockers 32 allows the system administrator to open each locker 32 door as well as detect when each locker door has been opened or closed. Each time the locker 32 door is opened, the user, locker number and time and date are recorded in the central database.

Information from the database required for system function is downloaded from the SAC 22 to the SCU 24. The SCU 24 downloads portions of this information to each LCU 26. Each LCU 26 stores data related to inputs, lock openings and closings, and alarm conditions for its corresponding lockers 32 and uploads this information to the SCU 24. The SCU 24 then reports this information back to the SAC 22. The SCU 24 also sends each LCU 26 the access codes for each locker hooked directly to a corresponding LCU 26. Each LCU 26 also stores transaction information. Furthermore, all LCUs 26 in the ECLS 20 communicate with each other through the SCU 24. Thus, the SCU 24 and LCUs 26 can be disconnected and the user can gain access to his/her locker from any LAS. Under normal operation the access code is verified at the LCU 26 for lockers and IDs 28 wired directly to the LCU 26. If the ID 28 is attached to a different LCU 26, then the LCU 26 requests verification from the SCU 24 and, if verified, passes the open command through the SCU 24 to the appropriate LCU 26. If the connection to the SCU 24 were severed, then this functionality would be severed but users can still gain access to the locker 32 from a LAS attached to the LCU 26 that his/her locker is attached to. The SCU 24 maintains the access codes for each locker 32 and also stores transaction information. The SCU 24 does not need to be connected to the SAC 22 for system operation.

The SCU 24 and LCU 26 are in constant communication so that if the connection between the two is severed, system function can continue.

The SCU 24 can operate without connection to the SAC 22 for long periods of time even if new or changed information has not been sent to the SCU 24.

Figure 7:
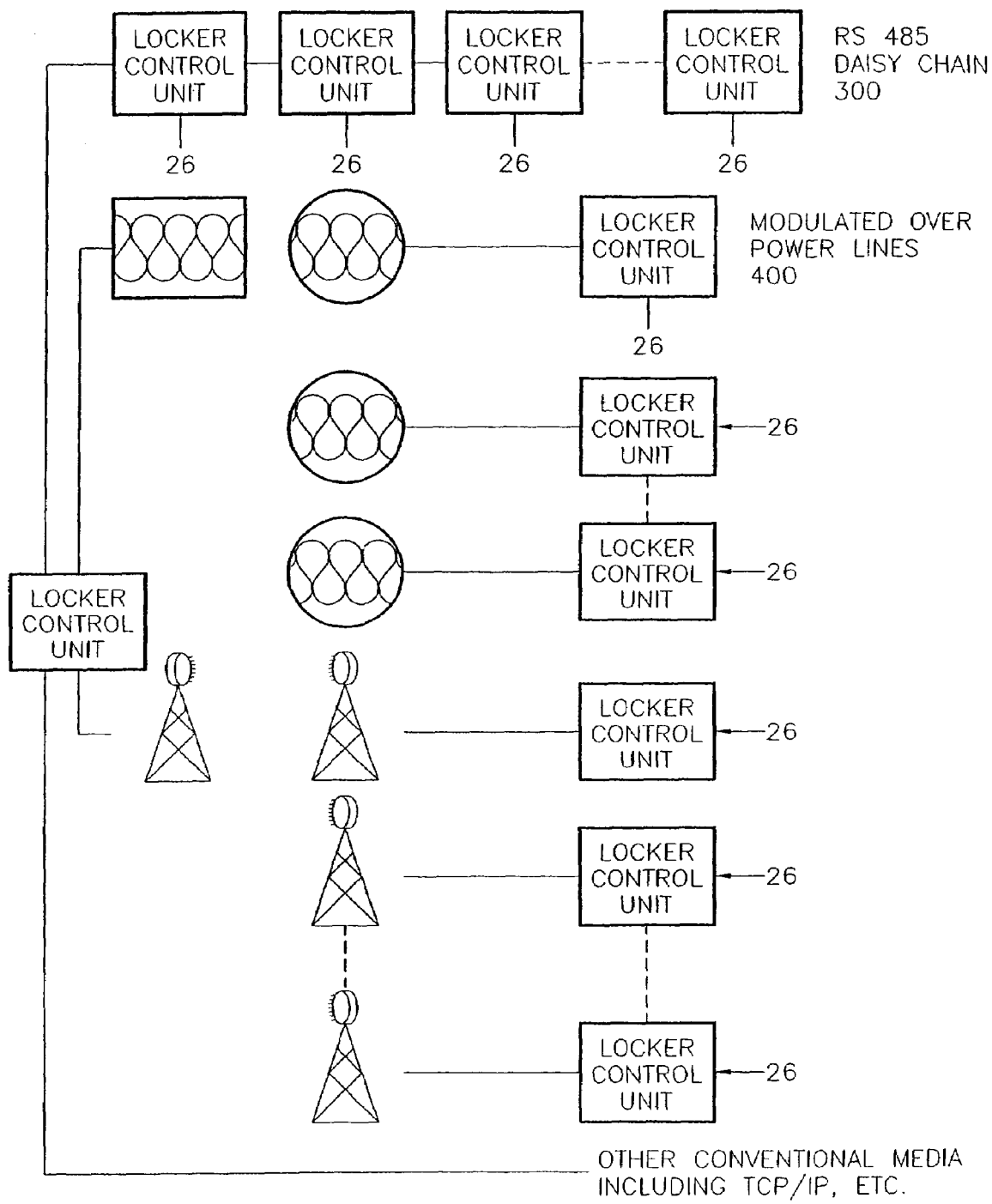
FIG. 7 is a functional diagram of alternative communication media between the system control unit (SCU) and the locker control units (LCUs)

The SCU 24, LCUs 26, IDs 28 and electronic locks 30 are all connected via low voltage wiring. The SCU 24 and LCU 26 connections can be over a variety of communication interfaces, such as a standard RS-485 interface specification by way of example only. Furthermore, the LCUs 26 may even be connected in a daisy chain configuration to reduce the number and length of wiring runs. As shown in FIG. 7, the ECLS 20 provides the ability to communicate between the SCU 24 and the LCUs 26 over different media, e.g., wireless technology 200, RS 485 Daisy Chain 300, modulated power line 400, etc. The wireless technology 200 eliminates the need to run wiring required by the RS-485 communication protocol. Where modulated power line 400 communication is utilized, the SCU 22 and the LCU 24 can be equipped with power line modem modules that are selectable for use with 110VAC or 240VAC systems.

It should further be noted that it is within the broadest scope of the present invention 20 to include an ECLS 20 that operates over the Internet. In particular, every component, or a select group of components, of the ECLS 20 may comprise an Internet address and wherein control and monitoring of the ECLS 20 is accomplished using a TCP/IP network.

As mentioned earlier, the system administrative user is a user that has access to and periodically uses the administrative software to configure, control and assign users to (students, members, etc.) the system 20. The system administrative user can possibly have limited access to the software depending on the security level that he/she has been assigned. The system administrative user of the ECLS 20 has management capabilities and more privileges and can lock out a particular locker. The administrator may deny access to one or all (selectable by various groups); the administrator may open one or all (selectable by groups). The administrative user is provided with a set of tools for setting up and controlling the system. Several reports are available to the administrator as well. The administrator can add, change, and delete individual users and can organize and identify individual users by various groupings. Access to lockers by individual users can also be restricted to specific time periods. The administrator can assign identification and location information to each locker and can also track maintenance needs for each locker. A card management feature gives the administrator full control over the management of individual user cards and is highly automated to make management of cards a simple task. Reports provide the administrator information on locker inventory, available lockers, users not assigned, repairs required, and various activity reports.

The administration software and database allows the administrator to assign each locker 32 to several different user-defined groups. (e.g., Area-Upper Campus; Building-Student Center; Hall A; etc.) Likewise, each user (e.g., student, member) can be assigned to one or more user-defined groups (e.g., sophomore, junior, senior; football team; drill team, band; Mrs. Thompson's home room, Mr. Green's home room; etc.). This ability to assign both lockers 32 and users to groups (also referred to as "virtual grouping capabilities") gives the administrator a powerful tool to manage lockers and users in the system. For example, the administrator can select all members of Mr. Green's home room class and automatically assign them lockers 32 in Hall A with a very minimal amount of input. Lockers 32 can be locked down, unlocked, or opened based on their group assignment (e.g., geographical location).

The software allows the administrator to create an unlimited number of time zone assignments that grant access to the user during specific day and time periods. Using the virtual grouping capabilities the administrator can apply these time zone assignments to groups of students instantly giving the administrator tremendous control over locker use. For example, the administrator can grant nominal access to the lockers 32 around standard school hours (e.g., Monday-Friday 8:00 a.m. to 4:00 p.m.) but allow members of the football team and drill team to have access to lockers following a late Friday night game.

Since the groups are user-defined, the ECLS 20 can be readily configured to meet the needs of any facility or organization.

As mentioned earlier, the administrative software comprises a central database. This database may comprise several databases (e.g., Tables 1-16) that are discussed next by way of example only and are not limited in any way to only those shown.

A "user database" is used to store locker user information. Depending on the environment that the software is used in, a user may be a student if the software is used in a school setting, or a client if the software is used in a health club setting. The following user information is stored in this database.

TABLE 1

User Database Structure

| FieldName | Description | Length | Type | Comments |
|---|---|---|---|---|
| FirstName | User first name | 20 | Alphanumeric | |
| LastName | User last name | 20 | Alphanumeric | |
| HomePhone | User Primary phone number | | | |

TABLE 1-continued

User Database Structure

| FieldName | Description | Length | Type | Comments |
|---|---|---|---|---|
| ContactName | Parent/Guardian Name | 20 | Alphanumeric | |
| ParentPrimPhone | Parent/Guardian Primary Telephone | | | |
| ParentSecPhone | Parent/Guardian Secondary Telephone | | | |
| UserID | User ID Number | 6 | Alphanumeric | |
| Gender | Gender | 1 | M or F | |
| Locker1 | Assigned Locker Number One | 6 | Alphanumeric | |
| Locker1 Access | Locker One Combination | 10 | Numeric | |
| Locker2 | Assigned Locker Number Two | 6 | Alphanumeric | |
| Locker2 Access | Locker Two Combination | 10 | Alphanumeric | |
| Grade | Grade | 1 | Alphanumeric | |
| HomeRoom | Home Room | 2 | Alphanumeric | Selected from home room data base. This field references the data stored in home room database. |
| GymPeriod | Gym Glass Period | 2 | Alphanumeric | 1–99 |
| Birthday | Members B Day | | Date | |
| VideoImage | Picture of Member | | | |
| UsageCount | Usage | | Numeric | Counter for number of usages remaining |
| LockerRoom | Locker Room | 2 | Alphanumeric | 1–99 |
| UserOne | User Group One | 2 | Alphanumeric | Selected from the user group database. This field references the data stored in the User Group database. |
| UserTwo | User Group Two | 2 | Alphanumeric | Selected from the user group database. This field references the data stored in the User Group database. |
| TimeZone | Time Zone | 2 | Alphanumeric | Time Zone that the user is allowed to access the locker. This field references the time zone database. |
| Comment | Comment | 200 | Memo Field | Allows for comments to be entered about student. |

The administrative software allows for the configuration of the institution name, address and telephone number. The system administrator creates this information during initial setup and customization of the software:

TABLE 2

Institution Name Setup

| Field Name | Description | Length | Type | Comments |
|---|---|---|---|---|
| SiteName | Name of Institution or organization | 20 | Alphanumeric | |
| Address1 | | 20 | Alphanumeric | |
| Address2 | | 20 | Alphanumeric | |
| City | | 30 | Alphanumeric | |
| State | | | Alphanumeric | |
| PostalCode | | | Alphanumeric | |
| Phone | Phone number for institution | | | |
| Fax | Fax number for institution | | | |

The administrative software also allows the system administrator to define certain security levels. These security levels allow the system administrator to designate others as "administrative users" and which limits these administrative users to access of certain functions and options.

TABLE 3

Security Levels

| Field Name | Description | Length | Type | Comments |
|---|---|---|---|---|
| ID | Security Level ID | | | Unique ID for each record |
| Description | Security Level description | 15 | Alphanumeric | Alpha description of security level |
| User | | 1 | Boolean | Ability to perform functions on individual users |

The administrative software also allows for the creation of user names, passwords and security levels. The user name and password is used to log onto the administrative software and perform functions. Depending on the security level that is selected for the individual, user functionality within the software is limited. Each administrative user can also be assigned a card number that they can use with the ECLS 20.

TABLE 4

Administrator User Setup

| Field Name | Description | Length | Type | Comments |
|---|---|---|---|---|
| UserID | User identification that is used to access the administrative software | 4 | Alphanumeric | Used in conjunction with the password below by administrative user to log into the software |
| Password | This password is used in conjunction with the userID above to access the administrative software | 4 | | Used in conjunction with the userID above to log into the software |
| UserFirstName | First name of user | 20 | Alphanumeric | |
| UserLastName | Last name of user | 20 | Alphanumeric | |
| SecurityLevel | Security level in administrative software that user has | 2 | Alphanumeric | This is the security level for the user. Security levels are predefined. |
| AccessNumber | Magnetic card access number | 10 | Alphanumeric | This is the magnetic stripe card of the user |
| TimeZone | Time Zone for user | 2 | Alphanumeric | |

The administrative user creates the locker database during initial setup and customization of the software. The locker database records information about every locker 32 in the ECLS 20. The locker database is used to assign locker users to specific databases.

TABLE 5

Locker Database

| Field Name | Description | Length | Type | Comments |
|---|---|---|---|---|
| RegNumber | Locker Registration Number | 10 | UniqueID | |
| Number | Locker Number | 6 | Alphanumeric | |
| Size | Locker Size | | | |
| Occupancy | Locker Occupancy | 6 | | Single or shared |
| Status | Locker status | 2 | Alphanumeric | Available, occupied, need repair, not available or other user defined. Status fields can be defined by user |
| Location | Location where locker is located | 2 | Alphanumeric | Location descriptions are stored in location description database. This field refers to this database |
| Cluster | Cluster where locker is located | 2 | Alphanumeric | Clusters descriptions are stored in cluster description database. This field refers to this database. |
| Zone | Zone where locker is located | 2 | Alphanumeric | Zone descriptions are stored in zone description database. This field refers to this database |

TABLE 5-continued

Locker Database

| Field Name | Description | Length | Type | Comments |
|---|---|---|---|---|
| Area | Area where locker is located | 2 | Alphanumeric | Area descriptions are stored in area description database. This field refers to this database. |
| Building | Building where locker is located | 2 | Alphanumeric | Building descriptions are stored in building description database. This field refers to this database. |
| Lock Type | Describes the type of lock installed on the locker opening | | Alphanumeric | Solenoid, Motorized |
| LastTran | Last transaction | | | |
| LastAlarm | Last alarm | | | |
| | Supervisor assignment | | | Supervisor or maintenance group |
| Maintenance | Last maintenance date | | Date Field | Date of last maintenance on locker ???? |
| | Combination | | | |
| LCU | | | | LCU number |
| Slot | | | | Slot number of LCU |
| Comment | | 200 | Memo | Comment Field |

The administrative user creates a holiday database during initial setup and customization of the administrative software. The holiday database is used in conjunction with the time zone database to determine the hours of access a user may have on a holiday.

TABLE 6

Holiday Database

| Field Name | Description | Length | Type | Comments |
|---|---|---|---|---|
| HolidayID | | 2 | Alphanumeric | Auto assigned ID |
| StatusDescrip | | 20 | Alphanumeric | Locker status description |

The administrative user creates the locker status database during initial setup and customization of the administrative software. The locker status database contains descriptions of locker status. The locker status database is referenced by the status field in the locker database. The default options for this database are "available, occupied, need repair, not available." The administrative user may also define other locker status descriptions.

TABLE 7

Locker Status Database

| Field Name | Description | Length | Type | Comments |
|---|---|---|---|---|
| StatusID | | 2 | Alphanumeric | Auto assigned ID |
| StatusDescrip | | 20 | Alphanumeric | Locker status description |

The administrative user creates the locker location database during initial setup and customization. This database allows for segregation of lockers into different locations.

TABLE 8

Locker Location Database

| Field Name | Description | Length | Type | Comments |
|---|---|---|---|---|
| LocationID | | 2 | Alphanumeric | Auto assigned ID |
| LocationDescrip | | 20 | Alphanumeric | Locker location description |

The administrative user creates a locker cluster database during initial setup and customization. This database allows for segregation of lockers into different clusters.

TABLE 9

Locker Cluster Database

| Field Name | Description | Length | Type | Comments |
|---|---|---|---|---|
| ClusterID | | 2 | Alphanumeric | Auto assigned ID |
| ClusterDescrip | | 20 | Alphanumeric | Locker cluster description |

The administrative user creates a locker zone database during initial setup and customization. This database allows for segregation of lockers into different zones.

TABLE 10

Locker Zone Database

| Field Name | Description | Length | Type | Comments |
|---|---|---|---|---|
| ZoneID | | 2 | Alphanumeric | Auto assigned ID |
| ZoneDescrip | | 20 | Alphanumeric | Locker zone description |

The administrative user creates a locker building database during initial setup and customization. This database allows for segregation of lockers into different buildings.

TABLE 11

Locker Building Database

| Field Name | Description | Length | Type | Comments |
|---|---|---|---|---|
| BldgID | | 2 | Alphanumeric | Auto assigned ID |
| BldgDescrip | | 20 | Alphanumeric | Locker building description |

The administrative user creates a locker area database during initial setup and customization. This database allows for segregation of lockers into different areas.

TABLE 12

Locker Area Database

| Field Name | Description | Length | Type | Comments |
|---|---|---|---|---|
| AreaID | | 2 | Alphanumeric | Auto assigned ID |
| AreaDescrip | | 20 | Alphanumeric | Locker area description |

The administrative user creates a user group database during initial setup and customization. This database allows for segregation of lockers into different groups.

TABLE 13

User Group Database

| Field Name | Description | Length | Type | Comments |
|---|---|---|---|---|
| GroupID | | 2 | Alphanumeric | Auto assigned ID |
| GroupDescrip | | 20 | Alphanumeric | Group description |

The administrative user creates a home room database during initial setup and customization. This database allows for segregation of lockers into different home rooms.

TABLE 14

Home Room Database

| Field Name | Description | Length | Type | Comments |
|---|---|---|---|---|
| HomeRoomID | | 2 | Alphanumeric | Auto assigned ID |
| Description | | 20 | Alphanumeric | Home Room description |

The administrative user creates a time zone database during initial setup and customization. This database allows for the ability to give specific locker users limited times during the day for access to their lockers.

TABLE 15

Time Zone Database

| Field Name | Description | Length | Type | Comments |
|---|---|---|---|---|
| Time Zone ID | Time zone id | 2 | Alphanumeric | Auto assigned ID |
| TZDescrip | | 20 | Alphanumeric | Time zone description |
| SunOpen | | 7 | Alphanumeric | Open time for Sundays |
| SunClose | | 7 | Alphanumeric | Close time for Sundays |
| MonOpen | | 7 | Alphanumeric | Open time for Mondays |
| MonClose | | 7 | Alphanumeric | Close time for Mondays |
| TueOpen | | 7 | Alphanumeric | Open time for Tuesdays |
| TueClose | | 7 | Alphanumeric | Close time for Tuesdays |
| WedOpen | | 7 | Alphanumeric | Open time for Wednesday |

TABLE 15-continued

Time Zone Database

| Field Name | Description | Length | Type | Comments |
|---|---|---|---|---|
| WedClose | | 7 | Alphanumeric | Close time for Wednesday |
| ThuOpen | | 7 | Alphanumeric | Open time for Thursday |
| ThuClose | | 7 | Alphanumeric | Close time for Thursday |
| FriOpen | | 7 | Alphanumeric | Open time for Friday |
| FriClose | | 7 | Alphanumeric | Close time for Friday |
| SatOpen | | 7 | Alphanumeric | Open time for Saturday |
| SatClose | | 7 | Alphanumeric | Close time for Saturday |
| HolOpen | | 7 | Alphanumeric | Open time for Holidays |
| HolClose | | 7 | Alphanumeric | Close time for Holidays |

This database is used to track when and what an administrative user has done in the software.

TABLE 16

Administrative Transaction Log Database

| Field Name | Description | Length | Type | Comments |
|---|---|---|---|---|
| RecordNum | | | Unique ID | Automatic record ID |
| Administrator ID | | 4 | Alphanumeric | Administrator id who performed the action |
| User ID | | 20 | Alphanumeric | User ID action performed on |
| User Name | | 20 | Alphanumeric | User name action performed on |
| Locker ID | | 6 | Alphanumeric | Locker action performed on |
| Date | | | Date | Date action performed |
| Time | | | Time | Time action performed |
| Action | | 2 | Alphanumeric | Action Performed |

The ECLS 20 also includes an option for importing/exporting data using a comma separated file (CSF) format. The data import/export option also processes the following formats:

Administrative Software Interface: The Schools Interoperability Framework (SIF) is an industry standard designed to provide data integration and maintain data accuracy across various K-12 educational administrative and curriculum systems. Programs that are SIF compliant allow for data to be entered once and automatically updated in all connected systems;

Another option provides for an ASCII file transfer option between the administrative software and the electronic locker software. This option provides a linked, interactive interface to other software packages, such as a school administration software package. Using this option, when data is updated in one program, the related field in the other program is automatically updated as well. This option eliminates the need for data import/export (i.e., it operates this function dynamically) and eliminates the need for inputting the same information in two different programs. This saves work and improves data integrity and enhances accuracy, since the data needs to be maintained in one place only.

Furthermore, the ECLS 20 also provides means to download data from the locker control software to a Palm Pilots device and can even provide the system administrator with the ability to perform all administrative functions remotely via the Internet; where the ECLS 20 is used in a fitness center setting, a software option is available that meets the specific requirements of the health club industry.

As mentioned earlier, the ECLS 20 includes monitoring and alarm functionality. In particular, the lock mechanism 30 contains a sensor device (not shown) to determine when the locker 32 door is opened. If the door is opened without, e.g., the user card 129A (129B or 129C) being swiped through the card reader 128, or without an administrative command being issued, an alarm is detected on the locker 30. A visible and audible signal will sound the SAC 22 when an alarm condition is triggered. Furthermore, it is possible to interface other security devices to the ECLS 20 such as cameras, and alert devices. These can be integrated to selectively activate when an alarm condition is triggered.

Where electronic access keys are used (e.g., such as the cards 129A-129C shown in FIG. 4), these cards can be used in the particular ECLS 20 for a variety of functions. For example, in a school setting, the card can not only be used for opening a locker 32, but also for tracking attendance at school, as a library card, and in a lunch program; similarly, in a work place setting, these cards can be used for building access, time keeping, locker access, and equipment checkout. In a fitness center, these cards can be used for admission, assigning and opening lockers, workout schedule and for purchasing refreshments, etc. Furthermore, with regard to the computer records of locker activity, these locker records can be unified with user records such as a student's class schedule.

The ECLS 20 provides quick, accurate and safe locker administration in that:

it provides for the re-assignment of lockers and access thereto which can be accomplished instantly by computer control.

it is compatible with current database software packages;

it uses computerized records of electronic locker locations and users that can be integrated with existing administration software;

its central administrative SAC 22 has complete control of locker opening parameters and access;

it provides for unified user and locker assignment records;

it provides for instant user re-populations;

it provides for recorded history of locker usage;

it alerts the administrator of attempted locker intrusions and records location, date and time.

during times when there is no user activity or when a manager or administrator does not want a user or users to access lockers (e.g., off-hours, sporing events, night school and vacations) any locker user can be locked out by the system administrator;

individual locations, or groups of lockers, can be opened for inspections, cleaning or maintenance.

all of the information in the administration software is password protected. Managers or administrators can choose who has access to locker information and how much information each user can view.

Thus, as described, the ECLS 20 provides secure storage with easy access for individual users and simple but powerful management tools for the system administrator. The ECLS 20 provides a safe, secure, convenient, accountable, centralized and time saver locker control system.

Figure 14:
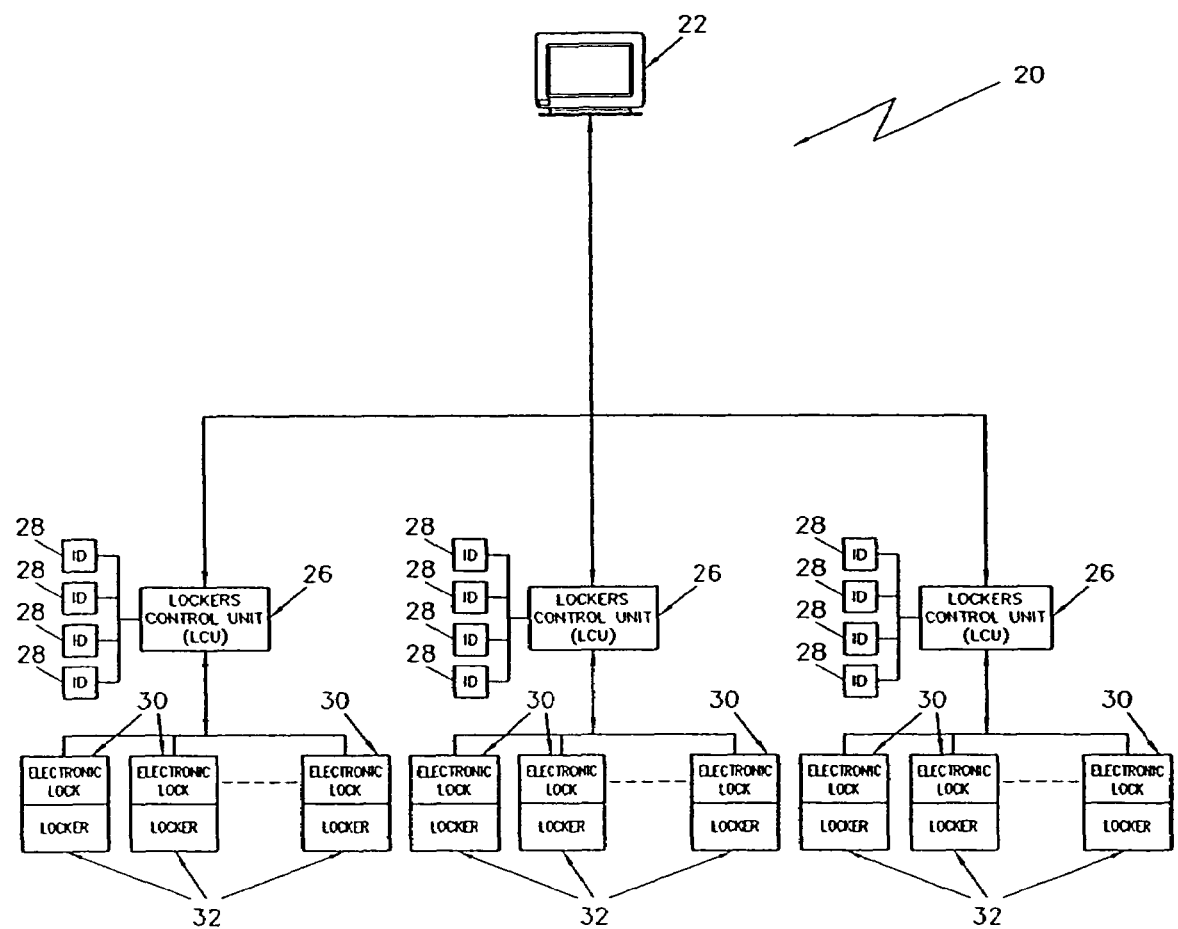
FIG. 14 is an alternative electronically-controlled locker system (ECLS) that does not use a system control unit (SCU).

It should be understood that it is within the broadest scope of the present invention to include an ECLS 20 that combines the functionality of the SCU 24 within the SAC 22. FIG. 14 illustrates such an ECLS 20 that does not require a SCU 24 and wherein a modified SAC 22' comprises the functionality of the SCU 24 therein. One of the advantages of having the SCU 24 is that the SAC 22 may comprise any type of conventional PC (as mentioned earlier) that is not dedicated to the ECLS 20. In other words, the SAC 22 may administer the ECLS 20 while supporting other normal business functions. On the other hand, where the ECLS 20 does not utilize a SCU 24, the SAC 22' is dedicated to ECLS 20 operation. However, in all other respects, the ECLS 20 that does not include the SCU 24 (FIG. 14) operates similarly to the ECLS 20 that does include the SCU 24 (FIG. 1) and provides all of the operations regarding locker access control, locker monitoring and virtual grouping, administrator control, etc., discussed earlier.

Without further elaboration, the foregoing will so fully illustrate our invention that others may, by applying current or future knowledge, readily adopt the same for use under various conditions of service.

We claim:

1. An electronically-controlled locker system for use by a plurality of authorized users and managed by an administrator, said system comprising:

a first plurality of lockers wherein each locker comprises a respective electronically-activated lock;

at least one input device for allowing the plurality of authorized users to communicate with said system;

at least one locker control unit, in communication with each electronically-activated lock and with said at least one input device, said at least one input device being in direct communication with said at least one locker control unit and said at least one locker control unit controlling the activation of said electronically-activated locks;

a computer, controlled by the administrator, for managing at least one database of authorized user and locker information;

a system control unit, in communication with said at least one locker control unit and with said computer, said system control unit providing said at least one locker control unit with said authorized user and locker information, said system control unit comprising a watchdog;

and wherein said at least one locker control unit uses data from said at least one input device and said authorized user and locker information to provide access to corresponding lockers for the plurality of authorized users and wherein said electronically-activated lock controls the locked or unlocked state of a corresponding locker door, said electronically-activated lock comprising:

an actuator electrically coupled to said locker control unit;

a switch, coupled in series with said actuator and not accessible to a user of the locker door, said switch completing an electrical circuit whenever said locker door is closed and opening said electrical circuit whenever said door is opened;

and wherein said actuator is momentarily activated by a first current pulse from said locker control unit to open said locker door and wherein said switch opens said electrical circuit upon activation of said actuator and wherein said locker control unit transmits a second current pulse to determine the locked or unlocked state of said locker door, said locker control unit receiving a return current pulse if said locker door is in a locked state and said locker control unit receiving no return current pulse if said locker door is an unlocked state.

2. A method for controlling access to a plurality of lockers for a plurality of authorized users by an administrator, said method comprising the steps of:

storing and maintaining information about the plurality of authorized users and said plurality of lockers, referred to as predetermined data, at a first location;

providing an electronic lock at each one of said plurality of lockers;

assigning a respective locker control unit to a respective subset of said plurality of lockers, each of said locker control units communicating directly with every electronic lock in said subset and each of said locker control units being located in the vicinity of a respective subset;

coupling at least one input device to one of said locker control units for permitting the authorized users in that subset to request access to their respective lockers, said at least one input device directly communicating with said one of said locker control units;

loading each of said locker control units with said predetermined data from said first location;

controlling access to each of said lockers in a subset by a respective locker control unit based on said predetermined data and said access request by the authorized users;

and linking each one of said locker control units to a system control unit and wherein said system control unit permits communication between said locker control units such that a first locker control unit can unlock a locker in a plurality of lockers that are assigned to a second locker control unit and wherein said step of controlling access to said lockers further comprises determining the open or closed state of said lockers using an electrical circuit which also controls unlocking said lockers and wherein said steps of controlling access to said lockers and determining the open or closed state of said lockers uses a first current pulse through said electrical circuit to unlock said lockers and a second current pulse through said electrical circuit to detect an open or a closed state of said lockers.

* * * * *